Edward A. Lavond
INVENTOR.

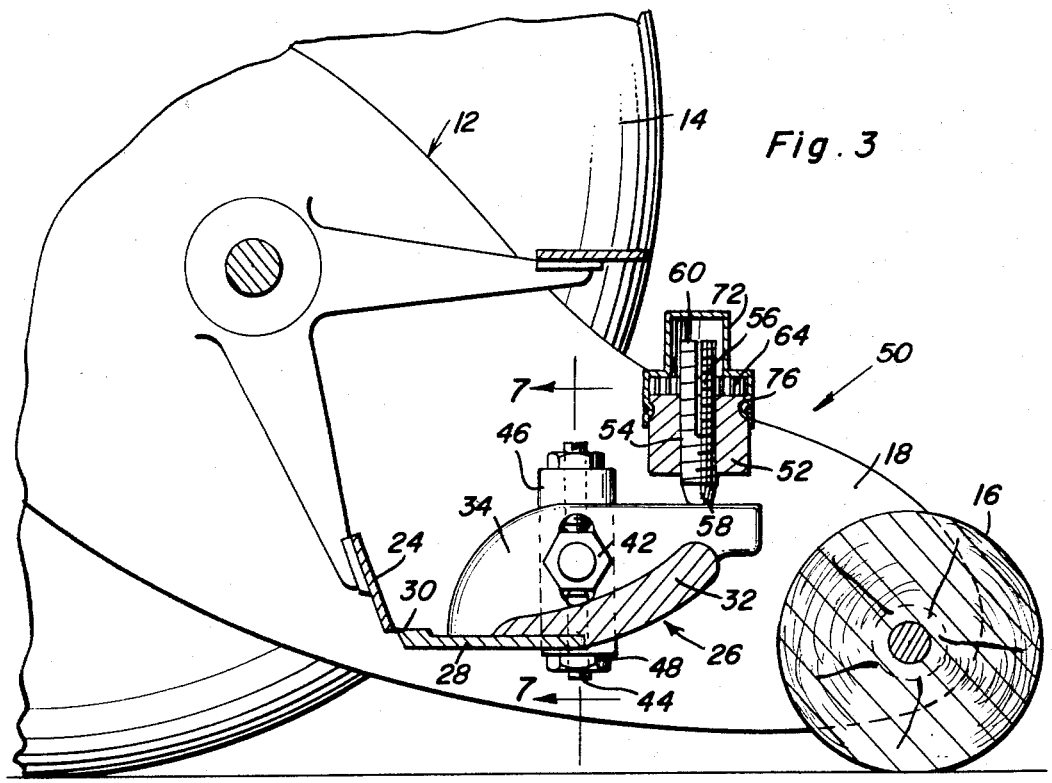
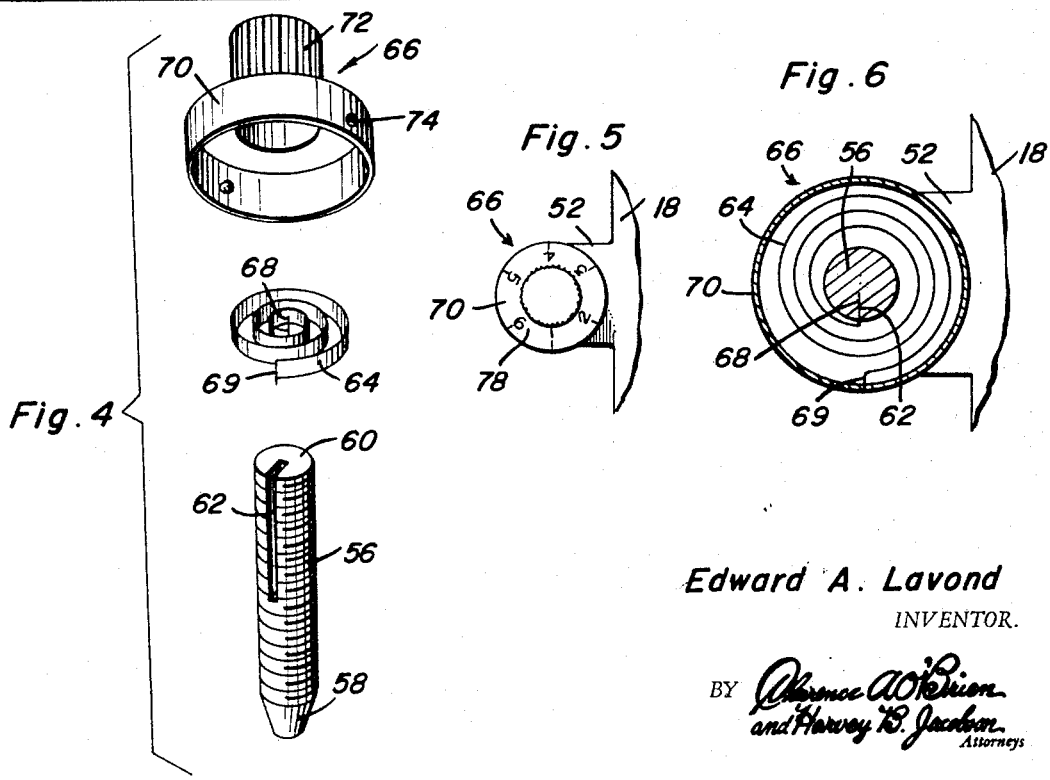

United States Patent Office 3,430,423
Patented Mar. 4, 1969

3,430,423
AUTOMATIC LOCKING CONTROL FOR CUTTER BAR
Edward A. Lavond, 5206 Dove Drive, Fair Oaks, Calif. 95628
Filed Mar. 31, 1967, Ser. No. 627,533
U.S. Cl. 56—249  15 Claims
Int. Cl. A01d 53/02

ABSTRACT OF THE DISCLOSURE

A reel type of lawnmower having a cutter bar in constant locked engagement with the rotating reel blades and automatic means for making wear adjustments in the cutter bar position. A self-locking screw engages the blade holder of the cutter bar to lock the cutter blade in position against displacement away from the reel blades while the screw is maintained under a preselected torsional stress so as to cause the cutter bar to take up wear. Height adjustment of the pivotal axis at one end of the cutter blade reestablishes parallelism between the reel and cutter blades so as to maintain proper contact pressure along the entire cutting edge of the cutter blade.

Background of the invention

This invention relates to an automatic take-up device for relatively movable cutter blades in general and more particularly to an automatically adjusting device for locking the cutter blade of a reel type lawnmower in position engaging the reel blades with a preseletced contact pressure.

The substantially stationary, horizontal cutter bar associated with a reel type of lawnmower requires periodic adjustment in its position relative to the reel assembly because of wear and development of irregularities in the blade cutting edge. Blade adjustment facilities heretofore provided as disclosed for example in Patent No. 1,865,993 to Worthington have however required manual operation and therefore the exercise of skillful judgment in the proper angular repositioning of the cutter bar. Also, adjustments made through prior adjusting devices did not eliminate the need for blade sharpening.

Adjustable stops have also been utilized in order to control or regulate the position of the cutter bar and the contact pressure between the cutter blade and the reel blades. Some of these adjusting devices were also designed to accommodate yieldable angular displacement of the cutter blade away from the reel blade presumably to avoid blade edge damage as disclosed for example in Patent No. 2,341,913 to Fields. Such arrangements however, not only fail to avoid such damage to the blade cutting edge but eliminated the self-sharpening attribute of the cutter bar arising from the rigid mounting thereof relative to the reel blades with which it is in moving contact. Thus, blade sharpening and manual positional readjustment was not avoided. The present invention therefore is addressed to the problem of eliminating manual angular adjustment of the cutter bar while at the same time providing for self-sharpening action.

Summary of the invention

An important object of the present invention is to provide a reel type lawnmower with automatic adjusting facilities for the cutter bar in order to maintain the cutter blade in non-yielding contact with the relatively moving contact edges of the reel blades without requiring any manual angular readjustment of the cutter bar.

In accordance with the foregoing object, the cutter bar is gravitationally biased in one angular direction about its pivotal axis tending to hold the cutter blade in contact with the reel blades. In the angular position to which the cutter bar is so biased, it is locked against displacement in one direction by means of a force transmitting take-up member. An adjustable spring bias is applied to the take-up member so that it may apply torque to the cutter bar about its pivotal axis only in a wear take-up direction.

The automatic blade control device of the present invention also features facilities for adjusting the contact pressure with which the cutter blade continuously engages the edges of the reel blades.

Yet another feature of the present invention which occupies a necessary cooperating relationship to the automatic take-up feature, is the provision of adjustment facilities for the pivotal axis of the cutter bar in order to align the cutter blade parallel to the reel blades for uniform contact therewith.

These together with other objects and advantages which will become subsequently apparent reside in the details of construction and operation as more fully hereinafter described and claimed, reference being had to the accompanying drawings forming a part hereof, wherein like numerals refer to like parts throughout.

Brief description of the drawing figures

FIGURE 3 is a partial sectional view taken substantially through a plane indicated by section line 3—3 in FIGURE 2.

FIGURE 4 is an isometric view showing some of the disassembled parts associated with the present invention.

FIGURE 5 is a partial top plan view of a portion of the control device associated with the present invention.

FIGURE 6 is a partial sectional view taken substantially through a plane indicated by section line 6—6 in FIGURE 2.

Description of the preferred embodiment

Figure 1:
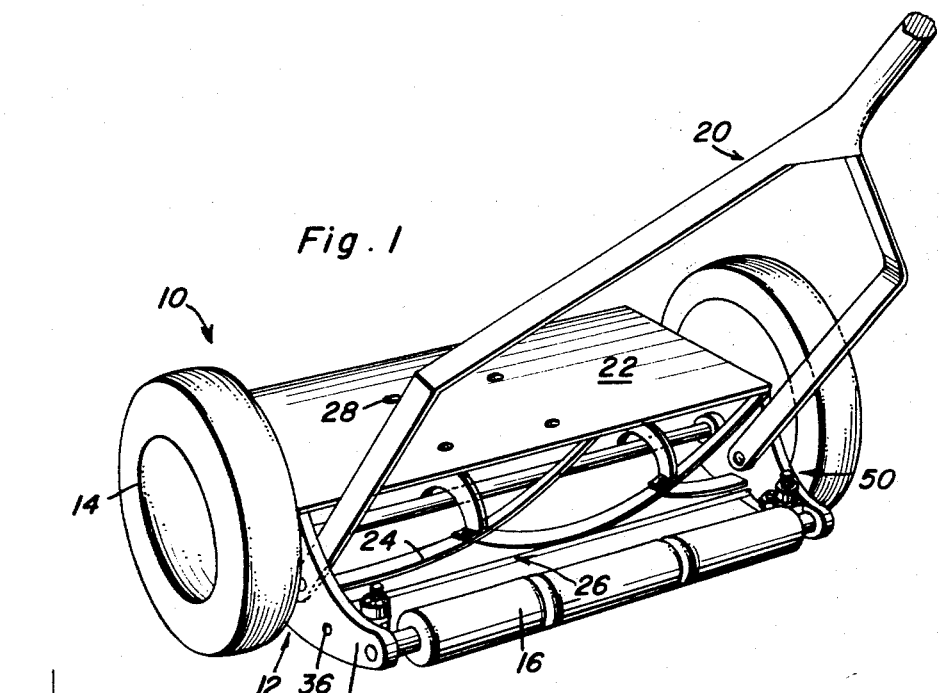
FIGURE 1 is an isometric view of a typical reel type lawnmower with which the present invention is associated.

Referring now to the drawings in detail, FIGURE 1 illustrates a typical reel type of lawnmower generally denoted by reference numeral 10 which includes a frame 12 supported closely spaced above the ground by the wheels 14, and the roller 16 extending laterally between the rearwardly extending portions 18 of the frame. A handle assembly 20 is pivotally connected to the frame and extends rearwardly and upwardly therefrom. Also mounted below the deck portion 22 of the frame is the usual reel assembly including a plurality of spiral reel blades 24. Thus, in response to rotation of the reel assembly, the curved edges of the reel blades engage the cutter bar assembly 26 which is mounted between the portions 18 of the frame rearwardly of the reel assembly. Rotation may be imparted to the reel assembly by the wheels 14 as the frame is pushed forwardly. Alternatively, a prime mover such as an internal combustion engine may be mounted on the deck portion 22 of the frame in order to impart powered rotation to the reel assembly and propel the lawnmower. Mounting holes 27 are accordingly provided on the deck portion 22 for anchoring the engine thereto.

The foregoing description refers to a conventional reel type of lawnmower wherein each of the reel blades 24 move into and out of contact with the cutter blade 28 as more clearly seen in FIGURE 3 which is mounted by the cutter bar assembly 26 in a substantially horizontal position. A portion of at least one of the reel blades is always moving laterally in contact along the longitudinal cutting edge 30 of the cutter blade at any instant. A minimum number of reel blades such as five is therefore required in order to prevent the cutter blade from rising upwardly between different reel blades. In accordance with the present invention, the cutter blade 28 is locked against angular displacement in a counterclockwise direction as viewed in FIGURE 3 about the pivotal axis of the cutter bar assembly 26 and is urged upwardly or clockwise under a preset bias so as to maintain proper contact pressure for self-sharpening purposes. This contact pressure may be selectively changed as will be hereafter explained. Further, the contact pressure which is continuously exerted on the cutter blade will automatically take up wear of the cutter blade and the reel blades that may occur after prolonged grass cutting operation.

Figure 7:
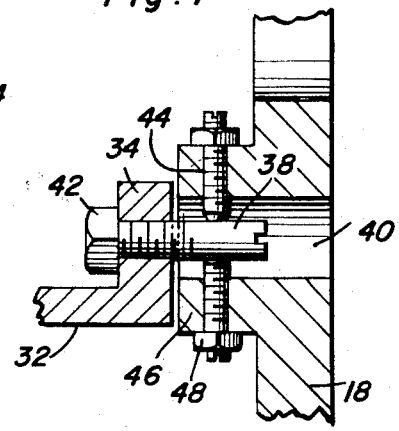
FIGURE 7 is a partial sectional view taken substantially through a plane indicated by section line 7—7 in FIGURE 3.

The cutter blade 28 is fixedly mounted by an elongated blade holder 32 and extends forwardly therefrom. The blade holder 32 is provided at opposite ends with upstanding pivot portions 34 as more clearly seen in FIGURES 3 and 7 so as to pivotally mount the blade holder and the cutter blade on the frame about a pivotal axis. The portions 18 of the frame are therefore provided with openings receiving pivot pins extending from the end portions 34 of the blade holder with sufficient clearance to accommodate pivotal movement. The pivot pin that extends from one end portion of the blade holder may therefore be rotatably supported within the opening 36 as shown in FIGURE 1 while the pivot pin 38 which extends from the opposite end of the blade holder is received within an enlarged opening 40 formed in the frame portion 18 as shown in FIGURE 7. A portion of the pivot pin 38 may be externally threaded for threaded mounting in the end portion 34 and provided with a head 42 in engagement with the end portion. A pair of adjustment screw support elements 44 are threadedly mounted by an inwardly projecting portion 46 of the frame portion 18 through which the opening 40 extends so as to engage the pivot pin 38 on diametrically opposite sides thereof. The screw elements may be locked in adjusted positions by the locknuts 48. It will be apparent therefore, that the pivotal axis of the blade holder may be vertically adjusted within limits by means of the screw support elements 44 projecting into opening 40 necessarily causing a slight pivotal displacement of the pivotal axis relative to the opening 36. This manual adjustment is necessary in order to reestablish parallelism between the cutter and reel blades should the reel blades as far as possible be ground out of alignment for example. This is to insure that the regulated contact pressure maintained between the cutter blade and the reel blades by means of the wear take-up devices 50 is uniform along the entire length of the cutting edge.

In the illustrated embodiment, two wear take-up devices 50 are mounted by the frame portion 18 adjacent opposite end portions of the cutter bar assembly. Both of the devices 50 are similar in structure and operation. It should however be appreciated that a single wear take-up device could be utilized for engagement with the cutter blade assembly intermediate the end portions thereof, suitable frame mounting means then being provided so as to properly position the wear take-up device at the desired location. The wear take-up device is effective to lock the blade holder and the blade fixedly secured thereto against angular displacement in one direction as well as to maintain a predetermined bias thereon in the other direction. The bias exerted by the wear take-up devices 50 augments the gravitational bias exerted by virtue of an unbalanced distribution of mass of the cutter bar assembly on opposite sides of its pivotal adjustment axis extending through the pivot pins 38. Thus, the cutter bar assembly 26 is heavier on the right side of its pivotal axis and will pivot in a clockwise direction under its own weight as viewed in FIGURE 3 into engagement with the reel blades 24 and will be held in engagement therewith with an additional bias applied thereto by means of the wear take-up devices 50.

Figure 2:
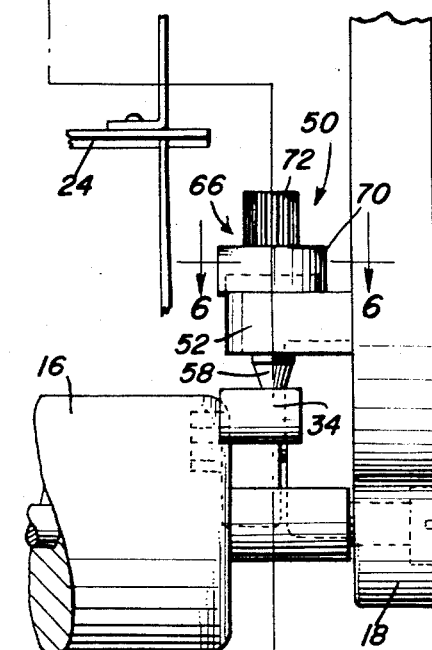
FIGURE 2 is an enlarged partial, rear elevational view of the lawnmower shown in FIGURE 1 embodying the automatic blade control features of the present invention.

Referring now to FIGURES 2 and 3, it will be observed that the frame portions 18 are each provided with an inwardly projecting nut element 52 having an internally threaded bore 54 which threadedly mounts a self-locking screw member 56. Thus, the screw member is capable of transmitting force in one direction only and is provided with a lower end portion 58 that engages the end portion 34 of the blade holder below the nut element 52. The opposite end portion 60 of the screw member projects upwardly above the nut element and is provided with a slot 62 on one side as more clearly seen in FIGURE 4. The screw member 56 is maintained under a preselected torsional stress so that it will exert an axial bias on the blade holder on one side of its pivotal axis opposite the side from which the cutter blade 28 projects.

The torsional stress is applied to the screw member 56 by means of a spiral, torsion spring element 64 which is enclosed within a pressure adjusting member 66 as shown in FIGURES 3, 4, 5 and 6. Thus, the radially inner end 68 of the spiral spring 64 is anchored to the screw member 56 by being received within the slot 62 thereof while the opposite, radially outer end 69 is anchored to the shield portion 70 of the pressure adjusting member 66 which is also provided with an upwardly extending knob portion 72 into which the screw member 56 extends. The pressure adjusting member 66 is therefore rotatably mounted on the nut element 52 and is provided with detents 74 cooperating with depressions 76 in the nut element so as to yieldably hold the pressure adjusting member in a plurality of adjusted positions that may be labeled by indicia 78 on the shield portion 70 as shown in FIGURE 5.

From the foregoing description, the construction of the adjusting control device of the present invention, its installation and operation will be apparent. It will be appreciated therefore, that the cutter bar associated with a reel type lawnmower may be automatically adjusted for compensating wear and also reduces the need for blade sharpening.

What is claimed as new is as follows:

1. In a reel type of lawnmower having a frame, reel blades mounted by said frame for nonyieldable contact with a cutter blade along an elongated cutting edge thereof, means for automatically maintaining the cutter blade in constant contact with the reel blades comprising, blade holder means mounting said cutter blade in operative relation to the reel blades, unidirectional force transmitting means mounted by the frame in engagement with the blade holder means for positively preventing displacement of the cutter blade away from the reel blades and spring means connected to the force transmitting means for continuously biasing the same in one direction urging the cutter blade into contact with the reel blades with a predetermined contact pressure.

2. The combination of claim 1 wherein said blade holder means includes an elongated member to which the cutter blade is rigidly secured, means pivotally mounting the member about a pivotal axis disposed between the cutter blade and the force transmitting means, said member on one side of the pivotal axis being heavier than the other side to gravitationally bias the cutter blade into contact with the reel blades.

3. In a reel type of lawnmower having a frame, reel blades mounted by said frame for nonyieldable contact with a cutter blade along an elongated cutting edge thereof, means for automatically maintaining the cutter blade in constant contact with the reel blades comprising blade holder means mounting said cutter blade in operative relation to the reel blades, unidirectional force transmitting means mounted by the frame in engagement with the blade holder means for displacement of the cutter blade in one direction only toward the reel blades and spring means connected to the force transmitting means for continuously biasing the same in said one direction thereby urging the cutter blade into contact with the reel blades with a predetermined contact pressure, said blade holder means including an elongated member to which the cutter blade is rigidly secured, means pivotally mounting the member about a pivotal axis disposed between the cutter blade and the force transmitting means, said member on one side of the pivotal axis being heavier than the other side to gravitationally bias the cutter blade into contact with the reel blades, said pivotal mounting means comprising pivot pins extending longitudinally from opposite ends of the member through openings formed in the frame, and adjustable means extending transversely into at least one of said openings for engagement with one of the pivot pins to adjustably position the member and the pivot axis thereof relative to the frame.

4. The combination of claim 3 wherein said unidirectional force transmitting means comprises, an internally threaded nut element fixed to the frame, and a self-locking screw member threadedly mounted by the nut element having opposite end portions, one of said end portions being in engagement with the blade holder means and the other of the end portions being connected to said spring means maintaining a torsional stress on the screw member to augment the gravitational bias exerted on the blade holder means.

5. The combination of claim 4 wherein said spring means comprises, a torsion spring element having opposite ends, one of said ends being received in a slot formed in the other of the end portions of the screw member, a pressure adjusting member connected to the other end of said torsion spring element and detent means mounting the pressure adjusting member on the nut element in enclosing relation to said other end portion of the screw member for yieldably holding the pressure adjusting member in different positions predetermining the contact pressure exerted by the cutter blade on the reel blades.

6. The combination of claim 4 wherein said spring means comprises, a torsion spring element having opposite ends, one of said ends being connected to the force transmitting means, a pressure adjusting member connected to the other end of said torsion spring element and detent means mounting the pressure adjusting member on the frame for yieldably holding the pressure adjusting member in different positions predetermining the contact pressure exerted by the cutter blade on the reel blades.

7. In a reel type of lawnmower having a frame, reel blades mounted by said frame for nonyieldable contact with a cutter blade along an elongated cutting edge thereof, means for automatically maintaining the cutter blade in constant contact with the reel blades comprising, blade holder means mounting said cutter blade in operative relation to the reel blades, unidirectional force transmitting means mounted by the frame in engagement with the blade holder means for displacement of the cutter blade in one direction only toward the reel blades and spring means connected to the force transmitting means for continuously biasing the same in said one direction thereby urging the cutter blade into contact with the reel blades with a predetermined contact pressure, said unidirectional force transmitting means comprising, an internally threaded nut element fixed to the frame, and a self-locking screw member threadedly mounted by the nut element having opposite end portions, one of said end portions being in engagement with the blade holder means and the other of the end portions being connected to said spring means maintaining a torsional stress on the screw member.

8. In a reel type of lawnmower having a frame, reel blades mounted by said frame for nonyieldable contact with a cutter blade along an elongated cutting edge thereof, means for automatically maintaining the cutter blade in constant contact with the reel blades comprising, blade holder means mounting said cutter blade in operative relation to the reel blades, unidirectional force transmitting means mounted by the frame in engagement with the blade holder means and spring means connected to the force transmitting means for continuously urging the cutter blade into contact with the reel blades with a predetermined contact pressure, said unidirectional force transmitting means comprising, an internally threaded nut element fixed to the frame, and a self-locking screw member threadedly mounted by the nut element having opposite end portions, one of said end portions being in engagement with the blade holder means and the other of the end portions being connected to said spring means maintaining a torsional stress on the screw member, said spring means comprising, a torsion spring element having opposite ends, one of said ends being received in a slot formed in the other of the end portions of the screw member, a pressure adjusting member connected to the other end of said torsion spring element and detent means mounting the pressure adjusting member on the nut element in enclosing relation to said other end portion of the screw member for yieldably holding the pressure adjusting member in different positions predetermining the contact pressure exerted by the cutter blade on the reel blades.

9. The combination of claim 8 wherein said blade holder means includes an elongated member to which the cutter blade is rigidly secured, means pivotally mounting the member about a pivotal axis disposed between the cutter blade and the force transmitting means, said member on one side of the pivotal axis being heavier than the other side to gravitationally bias the cutter blade into contact with the reel blades.

10. In combination with relatively movable cutter blades mounted by a frame, means for continuously maintaining one of the cutter blades in contact with the others with a predetermined contact pressure comprising, a blade holder fixedly mounting one of the cutter blades in operative relation to the other blades, means for pivotally mounting the blade holder in the frame about a pivot axis parallel to the other cutter blades, wear take-up means mounted by the frame in engagement with the blade holder for positively preventing displacement of said one of the cutter blades away from the other of the cutter blades to hold the blades in contact with each other, and biasing means operatively connected to the take-up means for applying a stress thereto urging said one of the blades into contact with the other of the blades thereby establishing said predetermined contact pressure between said cutter blades.

11. The combination of claim 10 wherein said take-up means comprises, an internally threaded nut element fixed to the frame, and a self-locking screw member threadedly mounted by the nut element having opposite end portions, one of said end portions being in engagement with the blade holder and the other of the end portions being connected to said biasing means maintaining a torsional stress on the screw member.

12. The combination of claim 11 wherein said means pivotally mounting the blade holder comprises pivot pins extending longitudinally from opposite ends of the blade holder through openings formed in the frame and support means extending transversely into at least one of said openings for engagement with one of the pivot pins to adjustably position the blade holder and the pivot axis thereof relative to the frame.

13. The combination of claim 12 wherein said biasing means includes an adjustment knob rotatably mounted by the frame, detent means yieldably holding the knob in a plurality of angular positions, and a spiral spring enclosed within the knob having opposite ends respectively connected to the knob and the wear take-up means.

14. The combination of claim 10 wherein said means pivotally mounting the blade holder comprises pivot pins extending longitudinally from opposite ends of the blade holder through openings formed in the frame and support means extending transversely into at least one of said openings for engagement with one of the pivot pins to adjustably position the blade holder and the pivot axis thereof relative to the frame.

15. In combination with relatively movable cutter blades mounted by a frame, means for continuously maintaining one of the cutter blades in contact with the others with a predetermined contact pressure comprising a blade holder fixedly mounting one of the cutter blades in operative relation to the other cutter blades, means for pivotally mounting the blade holder in the frame about a pivot axis parallel to the other cutter blades, wear take-up means mounted by the frame for engaging the blade holder with a constant unidirectional force and biasing means operatively connected to the take-up means for applying a stress thereto establishing said predetermined contact pressure, said biasing means including an adjustment knob rotatably mounted by the frame, detent means yieldably holding the knob in a plurality of angular positions, and a spiral spring enclosed within the knob having opposite ends respectively connected to the knob and the wear take-up means.

References Cited

UNITED STATES PATENTS

| | | | |
|---|---|---|---|
| 1,206,262 | 11/1916 | Shellenberger. | |
| 1,693,559 | 11/1928 | Hall. | |
| 1,865,993 | 7/1932 | Worthington | 56—249 |
| 2,071,162 | 2/1937 | Davis et al. | 56—249 |
| 2,341,913 | 2/1944 | Fields | 56—249 |
| 2,624,169 | 1/1953 | Cole | 56—249 |

FOREIGN PATENTS 108,986  11/1939  Australia.

ABRAHAM G. STONE, *Primary Examiner.*

P. A. RAZZANO, *Assistant Examiner.*